United States Patent

Hsu et al.

[11] Patent Number: 5,820,647
[45] Date of Patent: Oct. 13, 1998

[54] PROCESS FOR PRODUCING STAINED CRYSTALLIZED GLASS

[76] Inventors: Kuo-chuan Hsu, 523, 7F-2, Nan-dah Road, Hsinchu; Ching-hsi Lin, 8, Aly 11, LN 469 Chung-sun Rd., Hsinchu; Hsien-Chung Tsai, 14, Sec. 4, Chung Hsing Road, Chutung, Hsinchu, all of Taiwan

[21] Appl. No.: 735,586

[22] Filed: Oct. 23, 1996

[51] Int. Cl.⁶ .......................... C03B 19/01; C03B 19/09; C03B 19/00; C03B 5/16

[52] U.S. Cl. .......................... 65/17.3; 65/17.6; 65/134.3; 501/17

[58] Field of Search ................... 65/17.3, 17.6, 65/63, 134.3; 501/17

[56] References Cited

U.S. PATENT DOCUMENTS 5,100,451  3/1992  Toussaint et al. ................ 65/17.3
5,256,179  10/1993  Crooker et al. .................. 65/60.2
5,271,754  12/1993  Bauerecker et al. ............... 65/17.3

*Primary Examiner*—Peter Chin
*Assistant Examiner*—Jacqueline A. Ruller
*Attorney, Agent, or Firm*—Rosenberg, Klein & Bilker

[57] ABSTRACT

A process for producing stained crystallized glass and its articles which is characterized in meeting production of various crystallized glass articles in small quantity. By this process, crystallized glass is obtained with patterns and colors alike to that of granites, marble, and other natural stones. The process of heat-treatment to a prepared batch compounded of crystallizable glass granules, color powder and water at a temperature higher than the softening point thereof results in fusion bonding of the glass granules. The color powder is compounded by inorganic pigment, suspension stabilizing agent, agglomerant, deflocculant agent, and crystallizable glass powder. The surface pattern is formed by grain boundary part of crystallizable glass granules, and part of the inorganic pigment in the color powder moving with the crystallizable glass powder.

4 Claims, 2 Drawing Sheets

_5,820,647_

PROCESS FOR PRODUCING STAINED CRYSTALLIZED GLASS

FIELD OF THE INVENTION

The present invention relates to a process of producing stained crystallized glass and its articles, especially refers to a method to obtain crystallized glasses with patterns and colors assembling to that of granites, marbles, and other stones, and applying to construction material, especially to great incombustible material.

Said "crystallizable glass" of this invention refers to crystallized glass formed by the softening and deformation through heat-treatment at a temperature higher than the softening point, simultaneously with needle-like crystals precipitating from surface toward the interior part in a direction normal to the surface. Said "crystallized glass" refers to the crystallizable glass having crystals in the interior after heat-treatment, becoming a coexistence of glass and crystals as shown in FIG. 5. In which A indicates crystalline phase of needlelike crystals of β-wollastonite, and B indicates remains of crystallizable glass.

BACKGROUND OF THE INVENTION

Crystallized glass obtained by heat treating crystallizable glass is characterized in excellent mechanical strength, heat-resistance, chemical corrosion strength, and water resistance, thus it can be used in various fields.

Nowadays, crystallized glass has been used in construction replacing natural stones due to its excellent characteristics and has obtained great popularity.

In prior art, the staining way of crystallized glass is adding oxide of Fe, Co, Ni, Cu, or Mn . . . etc. in glass material as stain, and with high heat the stain is fusion bonded with the glass material; thus stained crystallized glass is deformed through heat-treatment to such crystallizable glass. However, such process of producing crystallized glass has disadvantages listed as below:

1. The stain added in glass material is constantly oxide composed of transition elements such as Fe, Mn, Co, Cu, . . . etc. Since most transition elements contain more than two ionic conditions, which usually changes its ionic valence with the increasing heat during crystallization process, the color of crystallized glass will alter with the alteration of relative capacity between two different ionic charge and results in color aberration. As the disclosure of Japanese Patent Publication No. 53-39884, black crystallized glass can be obtained by adding $Fe_2O_3$ as stain. However, following problems is subjected as disadvantages of the process by the disclosure of Japanese Patent Publication No. 63-201037
   a) During the heat-treatment in crystallization process, the hue of stain will alter with the transfer from $Fe^{2+}$ to $Fe^{3+}$, thus the black hue of crystallized glass comes out unsteady and uneven.
   b) As the production for arc plate of crystallized glass, a heat-treatment to a previous completed crystallized glass flat plate at 800° C.~900° C. is obtained in order to form a bending shape, which will absolutely bring an access of transfer from $Fe^{2+}$ to $Fe^{3+}$ and result in obvious color aberration. The color aberration will be much obvious especially when the flat crystallized glass plate and arc crystallized glass plate are bonded together when use.

Further, the inventor found that while CuO is added in crystallizable glass as stain for green crystallized glass, the color of completed crystallized grass comes between green and brown in uneven state due to the unpredictable alteration of relative capacity of $Cu^+$ and $Cu^{2+}$ in fusion glass.

2. During the melting process in furnace, the method adding oxide stain in glass material for producing crystallized glass only suits production of few varieties in large quantity instead of various production in small quantity.

Accordingly, the Japanese Patent Publication No. 5-43651 and Patent Publication No. 130902 of Republic of China subjected an improvement by mixing crystallizable glass with inorganic pigment prior to the process of heat-treatment to produce crystallized glass articles. This prior art indeed reach the goal of a various production in small quantity, and avoiding color aberration owing to the obtained inorganic pigment of oxide with property of high heat-resistance preventing from ionizing when being heat-treated with crystallized glass. The step of adding water is obtained in this process for compounding glass granules and powdery inorganic pigment as a batch poured into a refractory mold and formed as stained crystallized glass by crystallization heat-treatment. In above described process, water is regarded as a media compounding glass granules and inorganic pigment as a batch which is heat-treated at 1100° C. for an hour to precipitate β-wollastonite precipitating in glass and fusion bond the batch as a body. In this process, the softening point of crystallizable glass is at about 700° C.; however, we knew that the fusion of glass granules begins at 850° C. and the vaporization temperature of water is 100° C. according to related document, that is to say the bonding media(water) no longer exists during the heat-treatment to glass and inorganic pigment at temperature higher than 110° C. Therefore, when the glass granules get softened, part of inorganic pigment directly contacting with the glass granules will simultaneously move with the glass granules, while the part failing to contact with the glass granules will float on the surface of softened glass because of absence of tractive power, isolated like an island in the sea, resulting in discontinuity of pigment causing spots in completed crystallized glass.

OBJECTS OF THE INVENTION

The main object of present invention is to solve the problems subjected above for the prior art, imparting a process of producing stained crystallized glass, which can not only solve the problem of color aberration and spots, but also obtain appearance much alike to natural stones.

The second object of present invention is to produce stained crystallized glass articles presenting natural pattern without color aberration and spot.

SUMMARY OF THE INVENTION

The present invention having a main feature of providing perfect combination between inorganic pigment and between crystallizable glass granules and inorganic pigment, making the inorganic pigment evenly adhere to surface of crystallizable glass granules and granules boundary, can obtain a stained crystallized glass with even color and natural look alike to natural stones after crystallization heat-treatment. The process of this invention includes following steps:

1. Preparing crystallizable glass granules, which have property of getting softened and precipitating crystals under heat-treatment at temperature higher than the softening point thereof.
2. Obtaining color powder by crushing dried glaze pulp compounding crystallizable glass powder having feature stated in Step 1, inorganic pigment, suspension stabilizing agent, agglomerant, deflocculant agent, water as additives, and formed by grinding with ball mill.

3. Adding proper content of water and agglomerant to compound glass granules in Step 1 with color powder in Step 2, then complete a perfect bonded batch of crystallizable glass granules and color powder through stirring, drying, and screening. When this batch is heat-treated at temperature higher than the softening point, the color powder containing crystallizable glass powder of tiny granule(<180um) which is earlier softened will form a continuous network at periphery of glass granules, with which the inorganic pigment adhere and move with glass powder; thereby the inorganic pigment presents a continuous, even distribution and no spots will occur after burnt.

4. Pouring the batch completed in Step 3 into a mold as shown in FIG.3, heat-treating at temperature higher than softening point for fusion bonding of each glass granules and precipitation of crystals as shown in FIG.4, meanwhile, the inorganic pigment will form a staining layer distributed evenly at surface of glass granules and granules boundary.

The obtained crystallizable glass in this invention can be softened for deform and precipitate crystals under heat-treatment at temperature higher than softening point.

The obtained inorganic pigment in this invention having property of heat-resistance besides the color required, in case of ionizing when being heat-treated with crystallizable glass and causing color aberration, is able to combine with crystallizable glass in state of oxide. This kind of inorganic pigment includes staining oxide such as Cd—Se, Er—Si—Se—Cd, Er—Si—Cd, Cu—Cr—Co, Er—V—Si, Co—Si, Co—Al, Co—Al—Er, Co—Cr, Er—Si—V—Co, Cr, Cr—Al, Er—Si—V—Pr—Fe, Er—Si—Cr, Er—Si—V—Pr, Cr—Ca—Si, Er—Si—Pr, Er—V, Cu—V, Er—V—Fe, Er—Si—Pr—Fe, Er—Fe—Si, Er—Fe, Cu—Cr—Ca—Si, Cu—Cr—Fe, Ti—Sb—Cr, Fe—Cr—Eu, Fe—Cr—Eu—Al, Er—Co—Ni, Su—Sb, Ni—Er, Er—Co—Ni—Si, Co—Fe—Eu, Er—Co—Si, Fe—Cr, Cr—Co—Fe—Ni, and staining oxide from mixture series of above content series.

DETAILED DESCRIPTION OF THE INVENTION

Following is detailed description on the present invention with reference to the accompanying drawings:

Pouring fusion crystallizable glass, a transparent viscid glass fused from batch of d crystallizable glass materials in fusion furnace at 1450° C., into cool water for water quenching to result in crushed glass granules which is collected for use after being dried and screened. The screening process is to maintain a certain grain fineness between 0.4~7 mm, since the grain fineness will not only influent the staining effect when it is less than 0.4 mm but also the crystallization treatment when it is larger than 7 mm.

2. Preparing Process of Color Powder

After adding inorganic pigment of required color, suspension stabilizing agent, agglomerant, deflocculant agent, and water into above crystallizable glass granules, grind the batch in a globe mill for about 4 hours to viscid liquid with grain fineness distribution of 5~80 um, called glaze liquid. Drying the glaze liquid, then crush it to color powder with grain fineness less than 0.2 mm, the tiny the better. The color powder includes 5~50$^{wt}$ % of inorganic pigment, 5~15$^{wt}$ % of suspension stabilizing agent, 0.1~0.5$^{wt}$ % of agglomerant, 0.1~3.0$^{wt}$ % of deflocculant agent, and 40~70 ml of water within additional 100 g of color powder as disperse medium. The content limit 5~50$^{wt}$ % of inorganic pigment in color powder owes to that if it is less than 5$^{wt}$ % the color will be too light when staining, while if it is more than 50$^{wt}$ %, the inorganic pigment will become a drag to the fusion and flow of glass granules. The limit of suspension stabilizing agent at 5~15$^{wt}$ % dues to that if it is less than 5$^{wt}$ %, the suspension stabilizing effect is to be influenced by the precipitate of glaze liquid; while when it is higher than 15$^{wt}$ %, the suspension stabilizing agent with high refractory quality will also raise the refractory quality of color powder and decelerate the fusion bonding of glass granules. The agglomerant functioning to increase the viscosity of water and decrease the precipitate of floating grains in glaze liquid is limited at the content of 0.1~5$^{wt}$ % in order to avoid too much precipitate caused by the low viscosity of water, the disperse medium, when the agglomerant content is less than 0.1$^{wt}$ %. Further, if the content is beyond 0.5$^{wt}$ %, the ground glaze liquid wilt come out too thick to pour into a mold.

Figure 1:
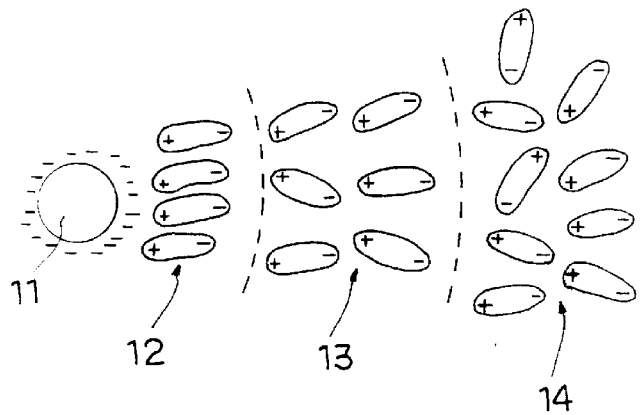
FIG. 1 is an illustration for the function of deflocculant agent in this invention.

Water glass, pure base, organic natrium salt are usually used as deflocculant agent functioning to increase the fluidity of glaze liquid. In the glaze liquid of the present invention, defloccant agent works mainly to substitute fixed bound water (2) at periphery of crushed glass powder or suspension stabilizing agent (11), thereby to increase the content of unfixed bound water (13) and free water (14) as shown in FIG. 1, elevating the fluidity of glaze liquid and efficiency of globe grinding. The content limit of defloccant agent at 0.1~3.0$^{wt}$ % dues to that if it is less than 0.1$^{wt}$ %,the incomplete dispersion will decrease the fluidity of glaze liquid and the efficiency of globe grinding, while if it is more than 3.0$^{wt}$ % not only the cost will be raised but will cause precipitate of glaze liquid after the bound water at the periphery of glass granules being almost substituted by Na$^+$ in defloccant agent. 40~70 ml of water are added into 100 g of color powder, because with water less than 40 ml will not only make the glaze liquid become too thick to pour into a mold but also decrease the efficiency of globe grinding, while with water more than 70 ml the glaze liquid will be too watery to be dried in next process.

3. The staining of Crystallizable Glass Granules

Figure 2:
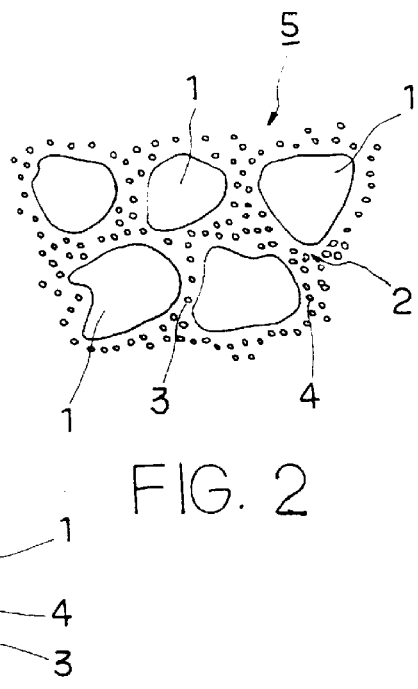
FIG. 2 is a structure illustration for the batch of stained crystallizable glass granules in this invention.
Figure 4:
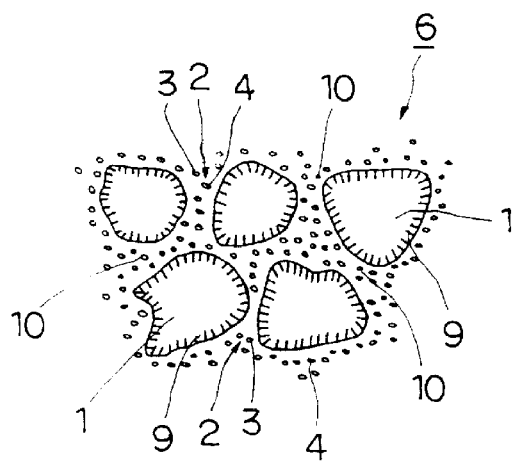
FIG. 4 is a structure illustration of ground result of batch in FIG. 3 after crystallization heat-treatment.
Figure 5:
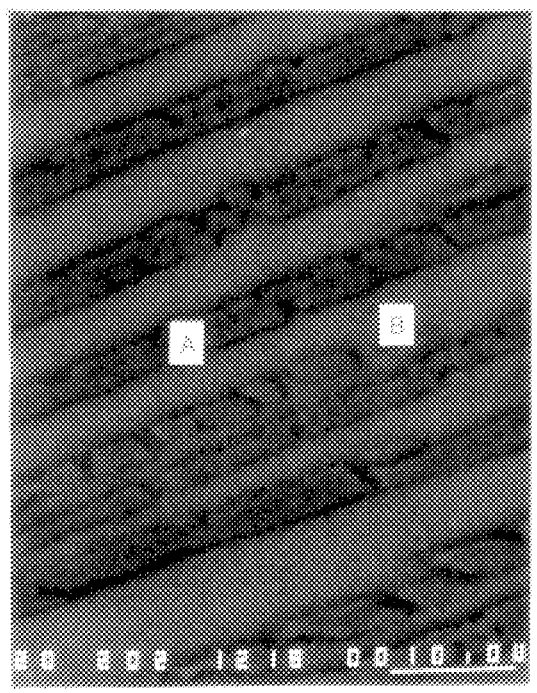
FIG. 5 is the coexisting organization of crystals(indicated as A) and glass(indicated as B) resulting from heat-treating crystallizable glass under electron microscope.

As shown in FIG. 2, stirring crystallizable glass granules (1) with color powder (2) and certain content of water in stirring machine to complete a batch (5) having crystallizable glass powder (3) and inorganic pigment (4) of color powder (2) evenly adhered to the surface of crystallizable glass granules (1). With relativity to crystallizable glass granules (1), the batch should contain 4~20% of color powder, and 2~20% of water. If the color powder is less than 4%, the color will come too light when staining, and more than 20% the color will get too dark and involve too large region, which will spoil the smooth pattern of crystallized glass (6) as shown in FIG. 4. Additive content of water less than 2% will make the batch incompletely compounded, while more than 20% will make the color powder (2) incompletely adhered to the surface of crystallizable glass granules (11) and result in too much remains of color powder (2).

4. Crystallization Heat-treatment

Figure 3:
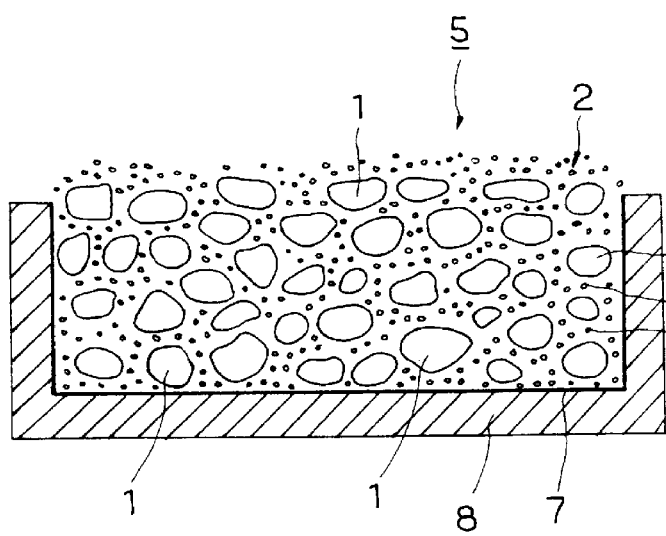
FIG. 3 is an illustration of batch in FIG. 2 poured in a mold before crystallization heat-treatment.

The stirred batch (5) of previous process was poured into a refractory mold (8) applied with mold release (7) as shown in FIG. 3, then subjected to heat-treatment at temperature higher than the softening point of crystallizable glass.

With the elevation of temperature, plurality of crystallizable glass granules begin fusing bonding with each other along wit the interface, simultaneously needle-like crystals are precipitated front both crystallizable glass granules and crystallizable glass powder as shown in FIG. 4, the inorganic pigment (4) distributing evenly in interface (10) to form a bonded body of crystallizable glass powder (3) and inorganic pigment (4) in interface (10), after cooling and polishing the surface, the crystallized glass presents surface pattern formed with stained main body and stained grain boundary strip.

Two preferred embodiments of the present invention will be described hereinunder:

First Embodiment

Glass granules with diameter of 1~3 mm are collected through process of fusion at 1450° C., water quenching, and drying subjected to the glass material comprising 58% of $SiO_2$, 6.0% of $Al_2O_3$, 19% of CaO, 1.9% of $K_2O$, 2.1% of $Na_2O$, 1.0% of $B_2O_3$, 7.0% of ZnO, 5.0% of BaO. Then, 20% of pigment of Zr—Co—Ni series, 10% of water-scrubbed China-clay suspension stabilizing agent, 0.1% of CMC (Carboxymethyl Cellulose) agglomerant, 0.2% of STPP (Sodium Tripolyphosphate) defloccant agent, 60% of water are added to the crystalllizable glass granules and globe ground into viscid liquid which are dried and crushed to form color powder. 20% of color powder relative to the weight of glass granules for staining are added in the crystallizable glass granules for stirring with 10% of water in stirring machine for 10 minutes. A refractory mold applied with $Al_2O_3$ is prepared for containing the batch of crystallizable glass granules and color powder and then heat-treated at 1100° C. for 1.5 hours. By this way, not only the β-wollastonite is precipitated from the crystallizable glass granules and crystallizable grass powder of color powder, but also a perfect bonded body of crystallizable glass granules and color powder, called unfinished plate, is completed simultaneously with the bond of crystallizable glass granules to crystallizable glass powder, which is polished after cooling to obtained a smooth crystallized glass plate with gray color.

Second Embodiment

Glass granules with diameter of 3~7 mm are collected through process of fusion at 1450° C., water quenching, and drying subjected to the glass material comprising 58% of $SiO_2$, 6.0% of $Al_2O_3$, 18.6% of CaO, 1.9% of $K_2O$, 2.1% of $Na_2O$, 1.0% of $B_2O_3$, 7.0% of ZnO, 5.0% of BaO, 0.4% of CuO. Then, 20% of pigment of Cr—Co—Fe—Ni series, 8% of water-scrubbed China-clay suspension stabilizing agent, 0.1% of CMC (Carboxymethyl Cellulose) agglomerant, 0.5% of STPP (Sodium Tripolyphosphate) defloccant agent, 60% of water are added to the crystalllizable glass granules and globe ground into viscid liquid which are dried and crushed to form color powder. 10% of color powder relative to the weight of glass granules for staining are added in the crystallizable glass granules for stirring with 5% of water in stirring machine for 10 minutes. A refractory mold applied with $Al_2O_3$ is prepared for containing the batch of crystallizable glass granules and color powder and then heat-treated at 1100° C. for 1.5 hours. By this way, not only the β-wollastonite is precipitated from the crystallizable glass granules and crystallizable glass powder of color powder, but also a perfect bonded body of crystallizable glass granules and color powder is completed, called unfinished plate, simultaneously with the bond of crystallizable glass granules and crystallizable glass powder, thus a crystallized glass plate with surface pattern formed by green main body and strip of black within grain boundary is obtained after cooling and polishing the unfinished plate.

What is claimed is:

1. A method of fabricating a stained crystallized glass material comprising the steps of:

(a) providing a first granular portion of a crystallizable glass compositions having a grain fineness within the approximately range of 0.4 mm to 7.0 mm;

(b) providing a second granular portion of a crystallizable glass composition, said second granular portion having a grain fineness within the approximating range of 0.4 mm to 7.0 mm;

(c) forming a glaze liquid by combining with said first granular portion in predetermined quantities, water and a plurality of additives, said additives including 5–50 wt % of an inorganic color pigment additive includes a staining oxide composition of a type selected from the group consisting of: Cd—Se, Er—Si—Se—Cd, Er—Si—Cd, Cu—Cr—Co, Er—V—Si, Co—Si, Co—Al, Co—Al—Er, Co—Cr, Er—Si—V—Co, Cr, Cr—Al, Er—Si—V—Pr—Fe, Er—Si—Cr, Er—Si—V—Pr, Cr Ca—Si, Er—Si—Pr, Er—V, Cu—V, Er—V—Fe, Er—Si—Pr—Fe, Er—Fe—Si, Er—Fe, Cu—Cr—Ca—Si, Cu—Cr—Fe, Ti—Sb—Cr, Fe—Cr—Eu, Fe—Cr—Eu—Al, Er—Co—Ni, Cu—Sb, Ni—Er, Er—Co—Ni—Si, Co—Fe—Eu, Er—Co—Si, Fe—Cr, and Cr—Co—Fe—Ni, 5-15 wt % of a suspension stabilization additive, 0.1–3 wt % of a defloculant additive, and 0.1–0.5 wt % of an agglomerant additive;

(d) forming a color powder by drying and grinding said glaze liquid to achieve a grain size in the approximating range of 5–80 μm;

(e) forming a batch by combining with said second granular portion in predetermined quantities said color powder and water;

(f) forming said stained crystallized glass material by heating said batch in a refractory mold at a predetermined temperature, said predetermined temperature being sufficiently high to cause bonding of said second granular portion and said color powder.

2. The method of fabricating a stained crystallized glass material as recited in claim 1 wherein said predetermined quantity of said color powder in said batch is a weight percentage within the approximating range of 4% to 20% and said predetermined quantity of said water in said batch is a weight percentage within the approximating range of 2% to 20%.

3. The method of fabricating a stained crystallized glass material as recited in claim 1 wherein said predetermined quantity of said color powder in said batch is a weight percentage within the approximating range of 4% to 20% and said predetermined quantity of said water in said batch is a weight percentage within the approximating range of 2% to 20%.

4. The method of fabricating a stained crystallized glass material as recited in claim 1 wherein said predetermined quantity of said color powder in said batch is a weight percentage within the approximating range of 4% to 20% and said predetermined quantity of said water in said batch is a weight percentage within the approximating range of 2% to 20%.

* * * * *